(12) United States Patent
Zhou et al.

(10) Patent No.: US 11,365,014 B2
(45) Date of Patent: Jun. 21, 2022

(54) SYSTEM AND METHOD FOR AUTOMATED TRACKING AND NAVIGATION

(71) Applicant: SZ DJI TECHNOLOGY CO., LTD., Shenzhen (CN)

(72) Inventors: You Zhou, Shenzhen (CN); Jie Qian, Shenzhen (CN); Xuyang Feng, Shenzhen (CN); Cong Zhao, Shenzhen (CN); Jiaqi Yan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 365 days.

(21) Appl. No.: 16/239,026

(22) Filed: Jan. 3, 2019

(65) Prior Publication Data

US 2019/0135450 A1    May 9, 2019

Related U.S. Application Data

(63) Continuation of application No. PCT/CN2016/088328, filed on Jul. 4, 2016.

(51) Int. Cl.
*B64D 47/02* (2006.01)
*G05D 1/00* (2006.01)
(Continued)

(52) U.S. Cl.
CPC .............. *B64D 47/02* (2013.01); *B64C 39/02* (2013.01); *B64C 39/024* (2013.01);
(Continued)

(58) Field of Classification Search
CPC .......... B64D 47/02; G08B 7/066; G08B 5/36; G05D 1/0016; G05D 1/0094; G05D 1/12; G05D 1/0202; G05D 1/0011; B64C 39/02; B64C 39/024; B64C 2201/027; B64C 2201/146; B64C 2201/141; G06F 3/017; G06K 9/00335; G06K 9/00342; G06K 9/00348; G06K 9/00355; G06K 9/00375; G06K 2209/21; B60K 2370/166;
(Continued)

(56) References Cited

U.S. PATENT DOCUMENTS 9,170,117 B1 * 10/2015 Abuelsaad ............. G01C 21/34
9,616,802 B1 *  4/2017 Kiriyama .............. B60R 25/246
(Continued)

FOREIGN PATENT DOCUMENTS

CN         101593510 A     12/2009
CN         103106659 A      5/2013
(Continued)

OTHER PUBLICATIONS

Knierim et al., "Quadcopter-Projected In-Situ Navigation Cues for Improved Location Awareness", 2018 (Year: 2018).*
(Continued)

*Primary Examiner* — Donald J Wallace
(74) *Attorney, Agent, or Firm* — Anova Law Group, PLLC

(57) ABSTRACT

A method for acquiring a target for a movable object includes providing a solicitation signal in response to receiving an initialization signal, detecting an action by one or more potential candidates in response to the solicitation signal, and identifying a target from the one or more potential candidates based on the detected action.

20 Claims, 13 Drawing Sheets

(51) Int. Cl.
*B64C 39/02* (2006.01)
*G05D 1/12* (2006.01)
*G08B 7/06* (2006.01)

(52) U.S. Cl.
CPC ......... *G05D 1/0016* (2013.01); *G05D 1/0094* (2013.01); *G05D 1/12* (2013.01); *G08B 7/066* (2013.01); *B64C 2201/12* (2013.01)

(58) Field of Classification Search
CPC .... G01S 13/66; G01S 2205/002; G01S 19/26; G01S 17/66; G01S 15/66; G01S 13/726; G01S 3/325; G01S 2205/09; G01S 15/04; G01S 17/04; G01S 13/04; G01C 21/365; G01C 21/3629; G01C 21/3626; G01C 21/3632; G01C 21/3635; G01C 21/34; H04W 4/024–029; G07F 17/3239; G06T 7/292

See application file for complete search history.

(56) References Cited

U.S. PATENT DOCUMENTS

| | | | | |
|---|---|---|---|---|
| 9,663,227 | B1 * | 5/2017 | Lema | G05D 1/0016 |
| 10,301,019 | B1 * | 5/2019 | Canavor | B64C 39/024 |
| 2004/0189720 | A1 * | 9/2004 | Wilson | G06K 9/00355 |
| | | | | 715/863 |
| 2008/0187173 | A1 | 8/2008 | Kim et al. | |
| 2010/0234998 | A1 * | 9/2010 | Kim | A47L 9/2805 |
| | | | | 700/259 |
| 2012/0287274 | A1 | 11/2012 | Bevirt et al. | |
| 2014/0152836 | A1 | 6/2014 | Morris et al. | |
| 2014/0244009 | A1 | 8/2014 | Mestas | |
| 2015/0134143 | A1 | 5/2015 | Willenborg et al. | |
| 2016/0304198 | A1 * | 10/2016 | Jourdan | G05D 1/0088 |

FOREIGN PATENT DOCUMENTS

| | | | | |
|---|---|---|---|---|
| CN | 103220825 | A | 7/2013 | |
| CN | 104077601 | A | 10/2014 | |
| CN | 105043379 | A | 11/2015 | |
| CN | 105141851 | A | 12/2015 | |
| CN | 105447459 | A | 3/2016 | |
| CN | 105513081 | A | 4/2016 | |
| CN | 105518555 | A | 4/2016 | |
| CN | 105578034 | A | 5/2016 | |
| CN | 105678805 | A | 6/2016 | |
| EP | 3098683 | A1 | 11/2016 | |
| WO | WO-2017155740 | A1 * | 9/2017 | B60R 25/00 |

OTHER PUBLICATIONS

The World Intellectual Property Organization (WIPO) International Search Report and Written Opinion for PCT/CN2016/088328 dated Mar. 23, 2017 11 pages.

Wenjing Han, et al., "An Improved Target Tracking Method Based on Multiple Instances Learning", Computer Applications and Software, vol. 30 No. 9, Sep. 2013.

* cited by examiner

SYSTEM AND METHOD FOR AUTOMATED TRACKING AND NAVIGATION

CROSS-REFERENCE TO RELATED APPLICATION

This application is a continuation of International Application No. PCT/CN2016/088328, filed on Jul. 4, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Movable objects, such as unmanned aircraft, can be used in many different fields such as film production, sporting events, disaster relief, geological study, and more. Unmanned aerial vehicles (UAV), also known as drones, can perform certain automated and semi-automated functions. Examples of such functions include tracking and navigation, which can be useful for taking aerial photographs or videos for moving targets.

SUMMARY

Described are systems, computer-readable media, and methods useful for target tracking by an object, such as a moveable object, that is equipped with a sensor. The tracking may commence with target acquisition that utilizes an interaction between a potential target and the object. For instance, when the object recognizes an initialization signal for initializing a target acquisition, the object transmits a solicitation signal that solicits an action by the potential target. If the potential target reacts to the solicitation signal properly, the potential target is recognized as the correct target and thus the target is accordingly acquired.

Sometimes, an acquired target may be lost or confusion may arise when there are other potential targets close by. In some embodiments, systems, computer-readable media, and methods are provided to confirm the acquisition. In one example, the object provides a status signal to indicate how well the target is following certain instruction from the object. While the following is poor, a warning signal may be transmitted requiring correction by the target. The status signal can also be updated while the correction is made.

The object may provide navigation guidance or any other information useful to the target while tracking the target. In a particular example, the target includes a group of individuals, and the navigation guidance may be crowd control or evacuation guidance. For instance, the object may detect an event (e.g., an emergency) associated with the group of individuals, and then generate a movement signal based on the detected event. The movement signal, sometime provided by two or more moveable object in concert, is to the individuals to assist with crowd control evacuation. The movement signal may be light signals or voice signals (e.g., with loud speakers), without limitation.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings of which:

DETAILED DESCRIPTION

Figure 1A:
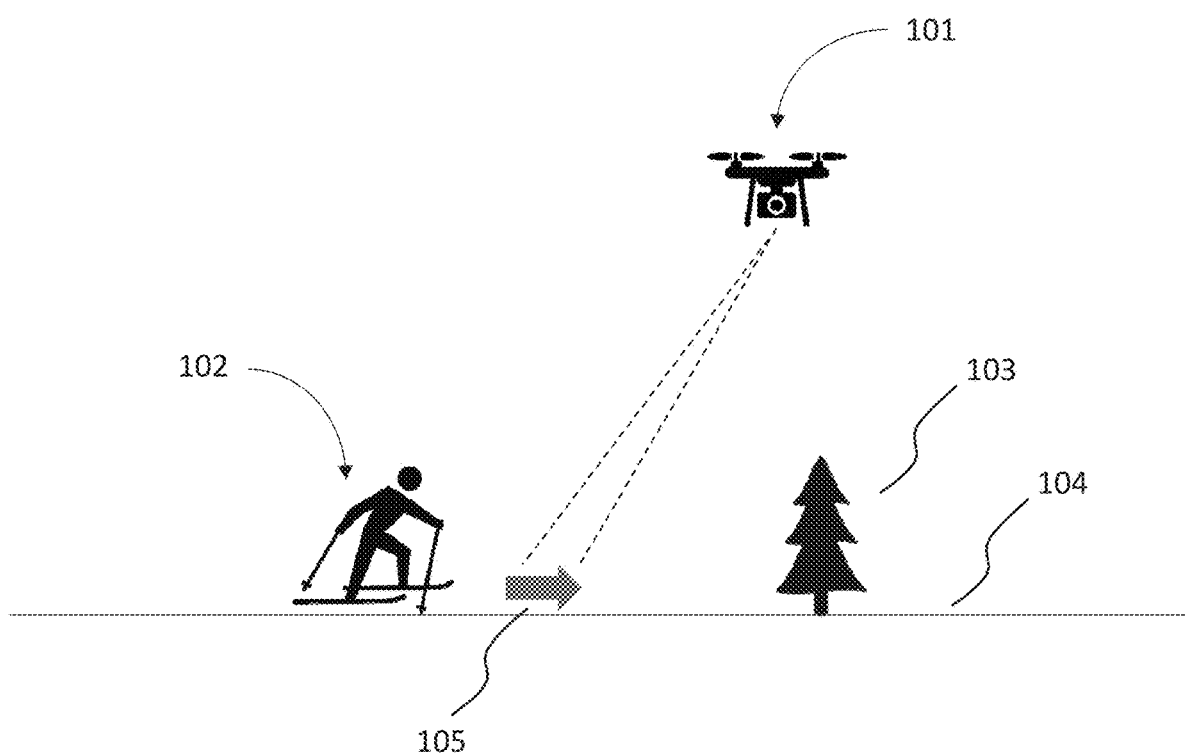
FIG. 1A illustrates providing a solicitation signal for acquiring a target.

Certain description as follows uses an unmanned aerial vehicle (UAV) as an example for a movable object. It will be apparent to those skilled in the art that other types of movable object can be used without limitation.

The present disclosure, in one embodiment, provides systems and methods for target tracking which may start with target acquisition. Target tracking may be useful for many purposes, such as sports photography. Once a target is acquired (e.g., identified), tracking can be further implemented when the target moves (or when the sensor moves). While tracking the target, it can also be useful to provide navigation guidance to the target.

In some instances, the target may be more than one object, and may dynamically change (e.g., in a relay race). For instance, when an image sensor is used in surveillance, the target can be any object within a geographic location, such as spectators in a sports stadium or shoppers in a grocery store. Target acquisition may be used to detect incidents among the objects, such as falling of a person or shoplifting.

The image sensor can be coupled with an UAV to enable its movement, which can be controlled by a user or by automation. In some instances, multiple UAVs can be employed, at least one of which is equipped with an image sensor while another of which carries out a different function, such as providing navigation. When multiple UAVs are used, it is also within the scope of the disclosure that each UAV has similar hardware but is commanded to carry out different actions coordinately, or has different hardware configuration. The present disclosure provides systems, methods and computer-readable medium for implementing such various aspects of the present technology.

Target acquisition generally refers to a sensor's identification, from within its detection range, an object. The object may be a tangible object such a person, a ball, a car, or a crowd that is preferably movable. The object can also be intangible such as an image projected on a wall or a shadow of a flying object. Depending on the object, suitable sensors can be readily selected. For instance, for visible objects, an image sensor (e.g., camera) can be used. For an underwater object, an ultrasound sensor is suitable. In darkness, then an infrared sensor is probably more sensitive than a typical camera.

In accordance with various embodiments, an initialization signal can be used for initiating target acquisition. For instance, a target acquisition may start with a target acquisition command. Each sensor can be controlled by a control device which includes at least a processor. The control device may be connected to the sensor directly, such as a UAV that is coupled to a camera. Alternatively, the control device is in wireless communication with the sensor. An example is a remote control unit of an UAV and another example is a smartphone that remotely controls the UAV.

The initialization signal can take many different forms. In some instances, the initialization signal preferably includes some initial clue for locating a target. For instance, the initialization signal can be a text message that includes a geographical location of the target. The location can be absolute (e.g., GPS coordinates) or relative (e.g., distance and angles from a reference location). The location can be a specific location or a range of locations. The location can be received by the control device from a remove device, such as via an electronic command in a software program, a text message, or a tweet.

In another example, the initialization signal is a visual sign, preferably in a predefined area. For instance, the visual sign can be a gesture (e.g., raising an arm) or movement (e.g., falling of a person or change of density of a crowd) by a person that is viewable by a camera. Other examples of body gesture or movement include bending of an upper body, taking a step, initiation of a movement by a static person, or stopping of a moving person. Likewise, the initialization signal can be a sound that can be detected by an audio sensor.

Upon receiving the initialization signal, a solicitation signal can be provided that is expected to direct an action from the target. The solicitation signal can take any format so long as it is effective to direct such an action. For instance, the solicitation signal can be a voice command (e.g., "move northwest"), a projected visual cue such as an image or a shape, or flashing light. The solicitation signal does not need to include an overt command for movement as it can be in any form that is understandable by the target.

After providing the solicitation signal, detection of an action by a target candidate in response to the solicitation signal can be carried out. Once a suitable action is detected, it can be ascertained that the candidate target that performs the action is the correct target for acquisition.

The action performed by the target is preferably in correspondence with the solicitation signal. In some instances, the relationship is apparent given the instruction embedded in the solicitation signal. For instance, if the solicitation signal includes a projected light on a ground, the action may be associating with the light, such as moving closer to the light. If the solicitation signal includes a projected area or boundary (e.g., within a predefined distance from the target), the action may be moving into the area or boundary. In another example, the solicitation signal includes a voice command or instruction, and the action is a performance following that instruction. In yet another example, the solicitation signal includes an electronic signal, such as a ray of light in a certain direction or a flashing LED light pointing at a certain direction, and the action may be movement or body gesture to that direction.

The action does not necessarily need to be a movement, however. In one example, the action can be an audio signal. In another example, the action is turning on a light. In yet another example, the action is a lack of movement when candidate target is already in motion, or when the surrounding objects are in motions.

FIG. 1A provides an example of target acquisition. A sensor in the form of a camera is coupled to an UAV (101) that flies above a ground (104), on which a person (102) and a tree (103) can be viewed by the camera. The person (102) clicks on a button on a smartphone interface (not shown) serving as the initialization signal. For example, the smartphone may use its internal GPS unit to determine a rough location of the person and uses the location to direct the UAV (101) to look for the person. Alternatively, the person moves into the view field of the camera and raises one of the arms, signaling the UAV to start target acquisition.

In response to the initialization signal, the UAV transmits a light signal onto the ground near the person, which light is projected as an arrow (105) on the ground. Seeing the projected arrow on the ground, the person (102) moves (e.g., skies) in the direction shown by the arrow, which movement can be recognized by the camera as an action in response to the solicitation signal. As further explained below, the interaction between the UAV and the person can also be used for providing navigation/movement guidance to the individual.

Figure 1B:
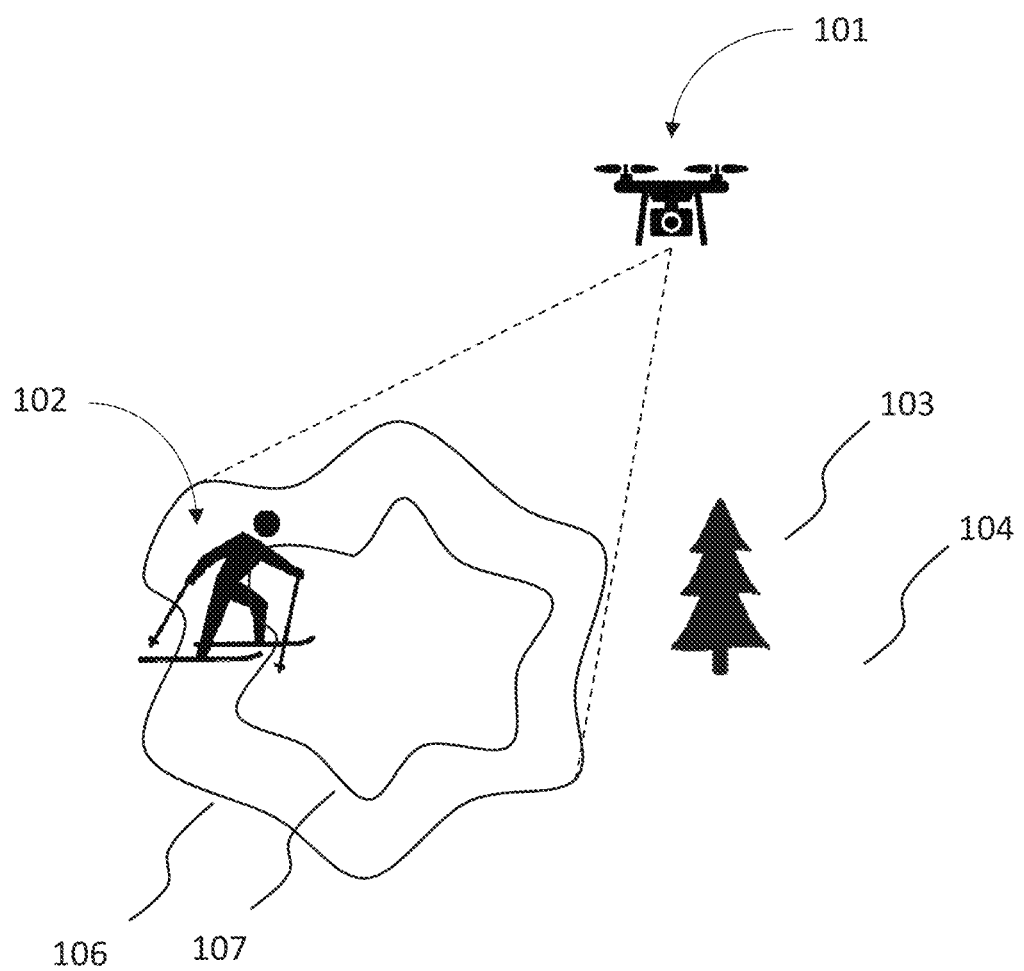
FIG. 1B shows a different example of solicitation signal.

Another illustrative example is provided in FIG. 1B, in which the solicitation signal includes two shapes one of which (106) encircles the other (107). The person, if not within either of the shape, can react to move into the shapes. Or, if the person is already in one of the shapes (as shown), the person can move into the smaller shape (107) or move closer to the center of shapes Detection of the action by a target candidate may be carried out by the same sensor as the one used to receive the initialization signal, if one is used. It is noted that the initialization signal can be received by electronic means (e.g., by text messaging) or with an audio sensor, and thus does not always require an image sensor. Detection of the action by a candidate target can also be carried out with a different image sensor even if an image sensor is already used for receiving the initialization signal. Detection of the action can also be done with other types of sensors, such as an audio sensor or an infrared sensor.

The detection can be done with methods known in the art. In one example, the image sensor may scan an area under its surveillance and monitor any movement for a predefined period of time. Each captured movement can then be assessed with a set of criteria with expected movements in response to the solicitation signal. A good or best match suggests that a candidate target that makes the movement is the correct target. In another example, the image sensor scans an area (e.g., the area defined by shape 107) as background, and any new object that shows up in that area is considered to be the correct target.

In the above disclosure, various steps, such as receiving an initialization signal and confirming the target from a detected action, require a processor and associated memory. Each of the steps can be carried out on a different apparatus, or alternatively some or all of them can be carried out on the same apparatus. Non-limiting examples of apparatuses include a device (e.g., UAV) coupled to a sensor, a wirelessly connected control unit that is specifically designed for controlling the device, or a smart phone or tablet that is in wireless communication with the control unit or the device.

In one example, the initialization signal is received at the control unit, the control unit instructs the device to transmit a solicitation signal, the device (e.g., UAV) detects a movement and transmits the movement information to the control unit, and the control unit carries out the identification of the target by processing the movement information. In another example, the initialization signal is received at the control unit, but the identification is carried out locally at the device.

In yet another example, the initialization signal is detected by a sensor coupled to the device, and the device transmits a solicitation signal, detects an action by a candidate target and uses the detection to identify a target.

Once a target is identified, in some instances, the geographical location of the target can be determined which may be useful for following or tracking the target. As disclosed above, sometimes the initialization signal can include a historic or rough geographic location of the target. Such a location can be refined or updated. In one example, determining the geographical location of the target takes as input the initial geographic location that comes with the initialization signal. In addition, this input can be combined with a location of the target relative to the sensor. In this respect, the geographical location of the sensor can also be useful. The geographical location of the target can also be refined by using the previous location data in combination with the movement.

There can be situations in which the target does not perform an action completely, or actions by more than one objects likely meet the criteria for the action, or the system desires to ensure that the target is correctly identified. It can also be the case that the target keeps moving or objects that appear like the target are close to the target to interfere with tracking of the target. It therefore may be useful to monitor or track the target or at times refine the monitoring or tracking.

In some instances, for the target acquisition or monitoring, after a target takes an action in response to a solicitation signal (such as the solicitation signals as disclosed above), the action is assessed with respect to its compliance to the action expected from the solicitation signal. Depending on the level of compliance, an indication (e.g., a status signal) is made so that the target may adjust the action to improve compliance. The initial action by the target, along with the follow-up improvement, can help improve the quality of target acquisition or monitoring.

Figure 2:
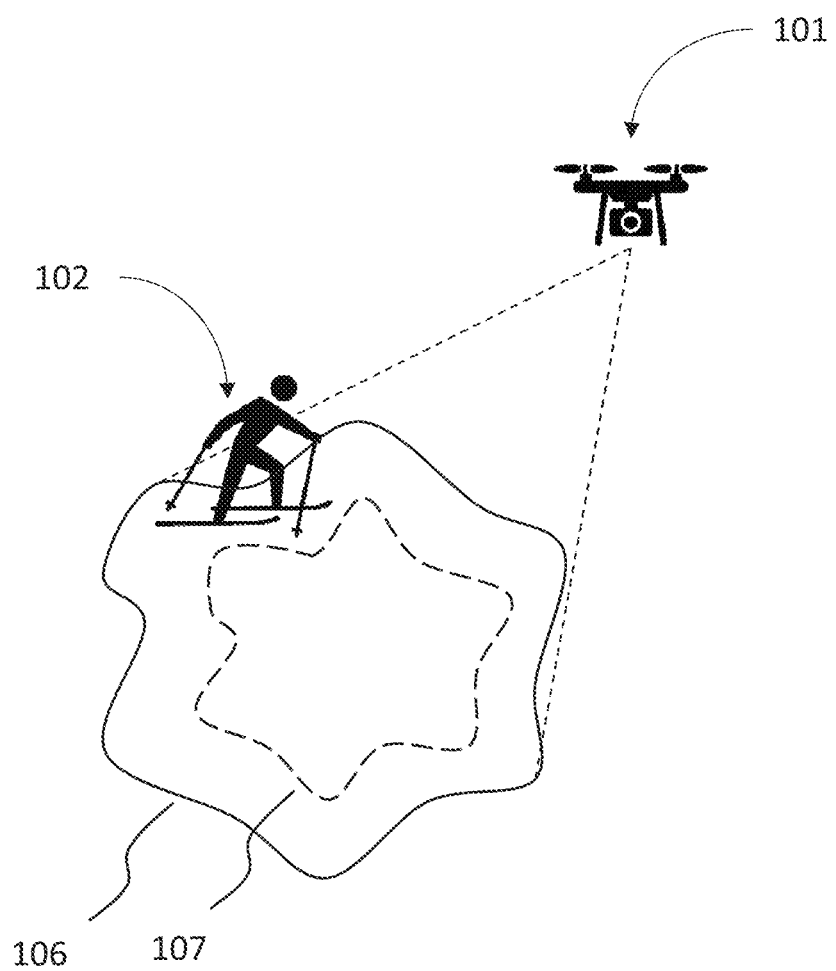
FIG. 2 illustrates a method for tracking a target and adjusting signals for improving tracking.

An example of target monitoring is illustrated in FIG. 2. In response to the projected shapes 106 and 107, the target 102 moves towards the center of shape 107. However, likely due to weather conditions, the targets moves up north. Even though the target stays within shape 106, it fails to reach in 107. Given that the target 102 is the only object proximate the shapes, it can be identified as the target. Nevertheless, to improve confidence of the identification, the device (e.g., UAV 101) generates a status signal to remind the target to try to take the appropriate action.

In one example, as shown in FIG. 2, the status signal can be a change of color or intensity, or a motion (e.g., flashing frequency) of the shape 107. The status signal can also change according to the level of compliance. For instance, if the target is moving away from the center of the shape, the frequency of the flashing of the shape goes up; when the target changes to the right direction, the frequency of flashing goes down.

In another version, the status signal is adjusted according to a finite number of statuses, such as "target is lost", "target is following but not on track, and "target is on track." Then for "target is lost," the status signal can be red; for "target is following but not on track," the status signal is yellow; and for "target is on track," the status signal is green.

During target acquisition or target monitoring, optionally the location of the target can also be used in locating the target. Determination of the location may be provided by a GPS device that is associated with the target, such as a GPS sensor contained in a wearable device, a wireless controller or a smartphone. The GPS information may be used to assist the initialization the target acquisition or augment the accuracy of target acquisition or monitoring.

Once a target is acquired, the system can provide various benefits to the target in addition to photographing or videotaping the target, such as navigation guidance and instruction for evacuation. To provide navigation, in some instances, it is helpful to have the sensor that detects and tracks the target on a moving object, such as an UAV.

A navigation signal can be provided to the target in any manner that may be received and interpreted by the target. Therefore, it may be helpful to identify ways to provide the navigation signal. In one example, a way to identify ways to provide the navigation signal includes collecting information of an environment associated with the target. The information depends on the environment and may include geographical or architectural features, traffic information or obstacles. For instance, if the target is a person walking or running on a fairly plain field, the environment is relatively simple, which includes the ground around the person.

Non-limiting examples of geographical features include location or shape of a slope, paving status or smoothness of a path, or location of non-solid surface. Examples of architectural features include location of a buildings, direction or boundary of roads, or road signs. Examination of such geographical and architectural features can provide useful information for providing navigation guidance, such as location of suitable surface for displaying the navigation guidance. Traffic information can include movement speed of traffic, distance to closest vehicle, or route to avoid traffic. Potential obstacles may include road blocks, uneven surfaces, or nearby moving objects.

Figure 3A:
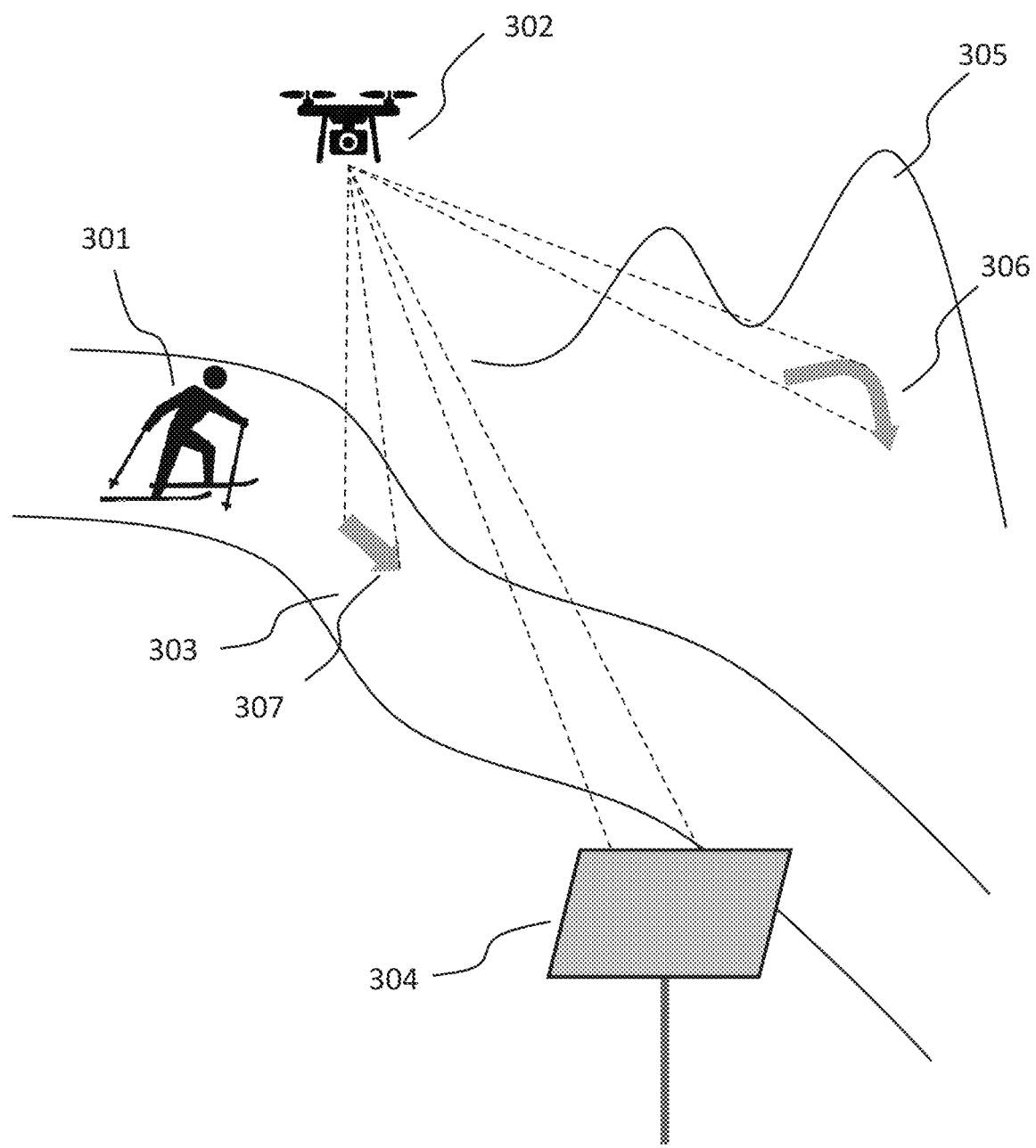
FIGS. 3A, 3B and 3C show different ways of providing navigation guidance to a target.

In another example, the target is moving along a path that is surrounded by structures with surfaces that are visible to the target. For instance, as illustrated in FIG. 3A, the target person 301 is skiing along a path 303. The UAV 302 flies above the ground and has identified the person as its target, and thus follows the person. While inspecting the environment of the target person, the UAV identifies a hill 305 and a bulletin board 304, each of which is suitable for displaying a navigation signal. Accordingly, the UAV projects a signal 306 in the shape of a curved arrow, on the side of hill 305, for the target person. Alternatively, the UAV can project a light signal on the bulletin board 304 (not shown). Nevertheless, even with such structures, the navigation signal can still be provided on the ground, such as arrow 307 over the path 303.

The navigation signal, in some instances, can be constantly on. Alternatively, the navigation signal is turned on periodically so long as the frequency is sufficient to effect the guidance. In another instance, the navigation signal is on when there is a need (e.g., before a change of direction or speed, or when requested by the target.

The surface for displaying the navigation signal can be selected to fulfill the purpose to delivering navigation guidance to the target. In some instances, the surface is in the direction of the movement of the target. In some instances, the surface is within visual distance to the target. In some instances, the surface has a color, hue or shape contrast from the surrounding surfaces so that it is easily recognizable by the target.

Figure 3B:
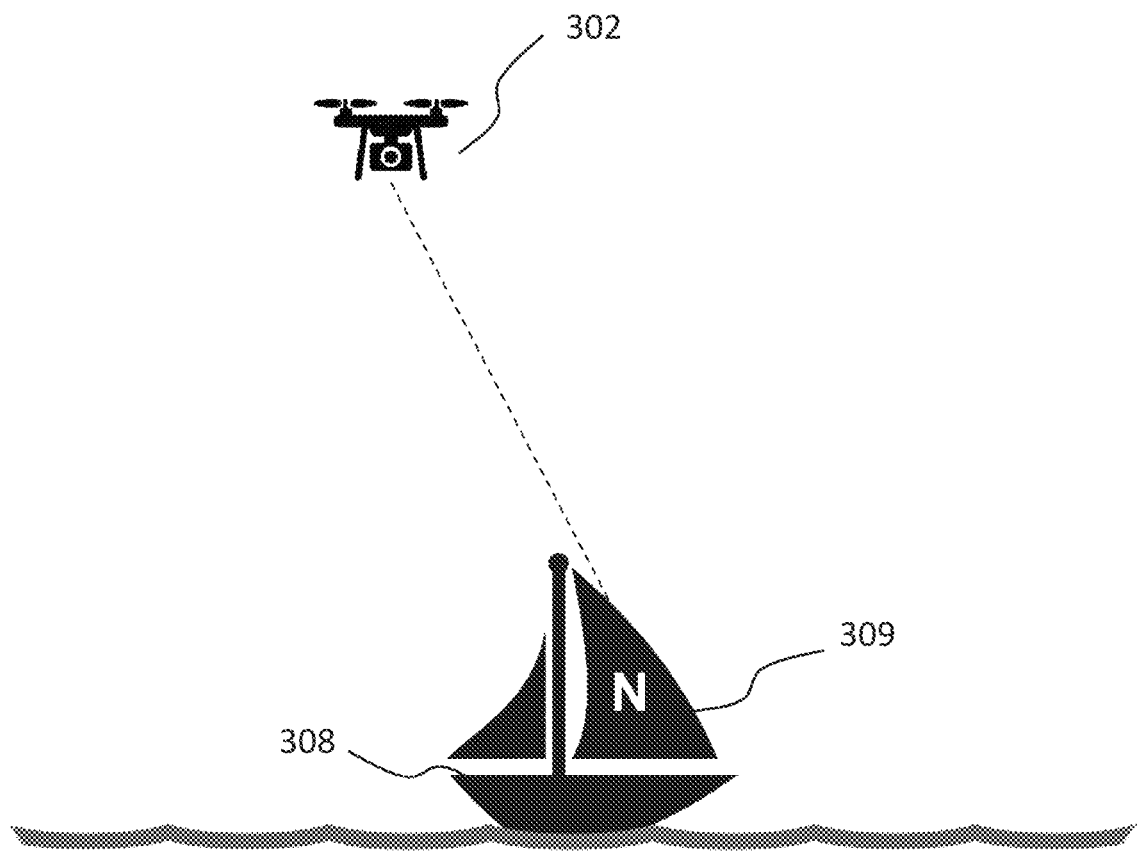

In one example, the target is a boat, such as a sailboat (see, e.g., sailboat 308 in FIG. 3B). The environment is the primarily water and sky. In this example, the navigation signal may be cast on the deck of the boat or on the sail (e.g., letter "N" on sail 309, indicating the north direction, in FIG. 3B).

The navigation signal may also be transmitted electronically, such as via a wireless signal, to a device held or used by the target (or a person operating the target). For instance, the navigation signal can be shown on a smartphone or tablet, a wearable device, or a screen coupled to a processor and wireless receiver. In one example, the navigation signal is displayed with a goggle, such as a Google® glass or a virtual reality (VR) goggle.

The navigation signal, however, does not have to be a shape or a letter, or even visual. In some instances, the navigation signal includes text or map. In some instances, the navigation signal includes a voice message or voice command.

Figure 3C:
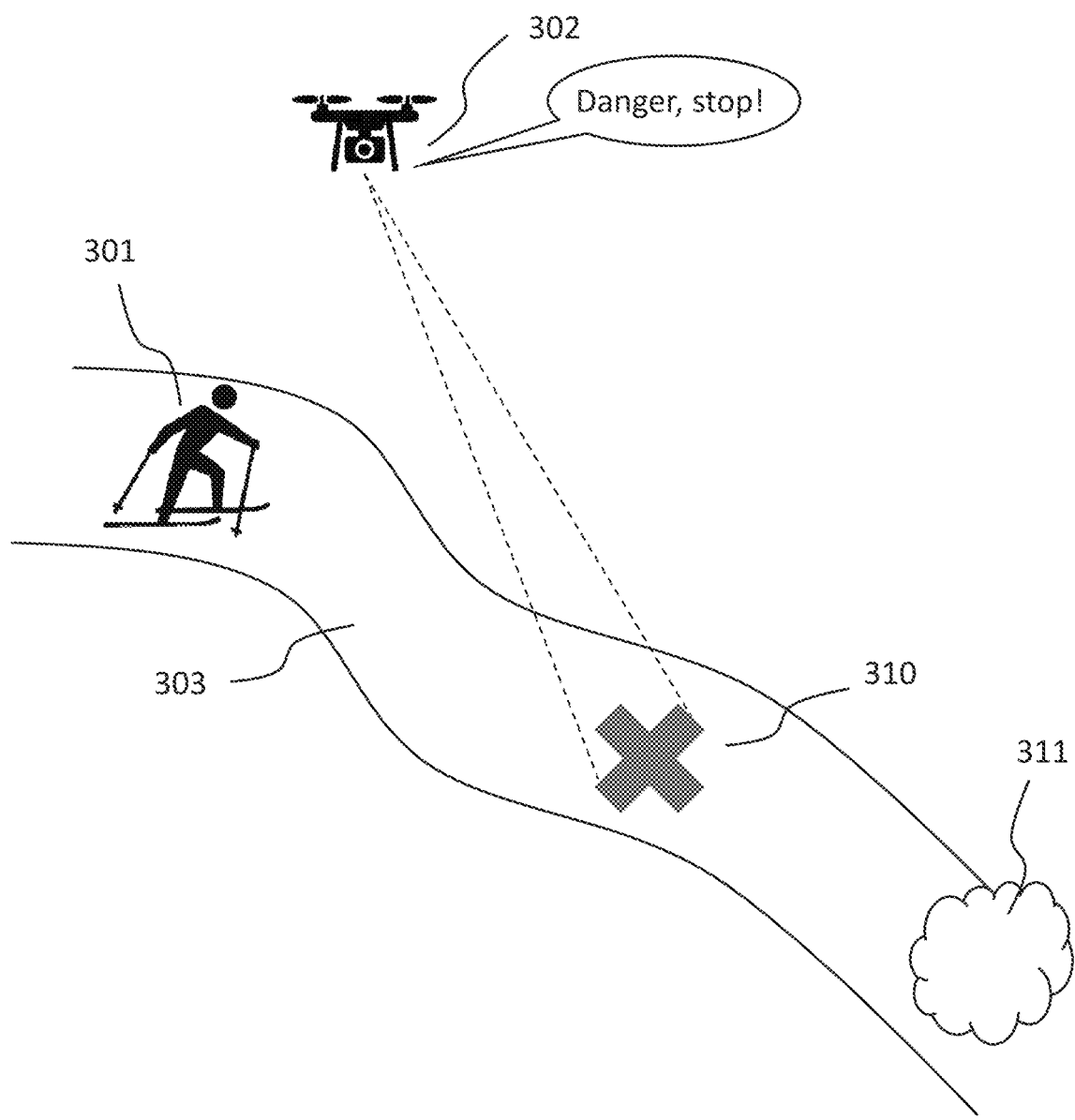

The navigation guidance provided by the methods of the above disclosure may be useful for directing a target to a predefine destination. Sometimes, real-time navigation guidance is provided. In other instances, it may also be used to adjust the navigation path based on detected abnormalities. For instance, as illustrated in FIG. 3C, the UAV 302 flies above or ahead of the target skier 301, and scans the path for potential hazards or obstacles (or traffic). Upon detecting the obstacle 311, the UAV sends out a warning navigation signal to the target. The signal may be a large "X" 310 on the path ahead of the skier. Alternatively or in addition, the UAV also transmits a voice warning, "Danger, stop!"

Target acquisition or navigation guidance is not limited to targets of a fixed object and may be used for changing objects or multiple objects. An example of a target of changing objects is a team of cyclists racing to the same destination. In this example, the target may be the one (or ones) leading the race, and navigation guidance may be provided to the leading cyclist while the others follow the leading one. Accordingly, in this scenario, in addition to acquiring and tracking the current leading cyclist or cyclists, the method further entails examining the surrounding in case a similarly moving cyclist passes the leading one or ones. Upon detection of such a passing, the new lead becomes the target.

Examples of targets with multiple objects include a school of fish, a flock of birds or insects, and spectators in a stadium. For purpose of illustration only, acquisition and tracking of fish, animals or insects may be useful for geological, agricultural or environmental purposes. For instances, when insects are detected as moving to a crop field, alerts can be given to farmers and sound alarms may be played to scare the insects away.

Crowd control is another example of acquiring and tracking a target of multiple objects. In this example, one or more apparatuses carrying sensors and signal transmitters can be flown around or above the crowd, or placed likewise (e.g., secured on a pole, a tree or a wall among or nearby the crowd). For crowd control, one example is detecting and handling an event (e.g., an urgent situation). An event may be the fall of a person within the crowd, a physical fight, addition of new individuals such that the total number of individuals in the crowd goes over a predefined limit, or occurrence of a hazard (e.g., explosion, loud noise). It can also be a time-out signal.

Figure 4A:
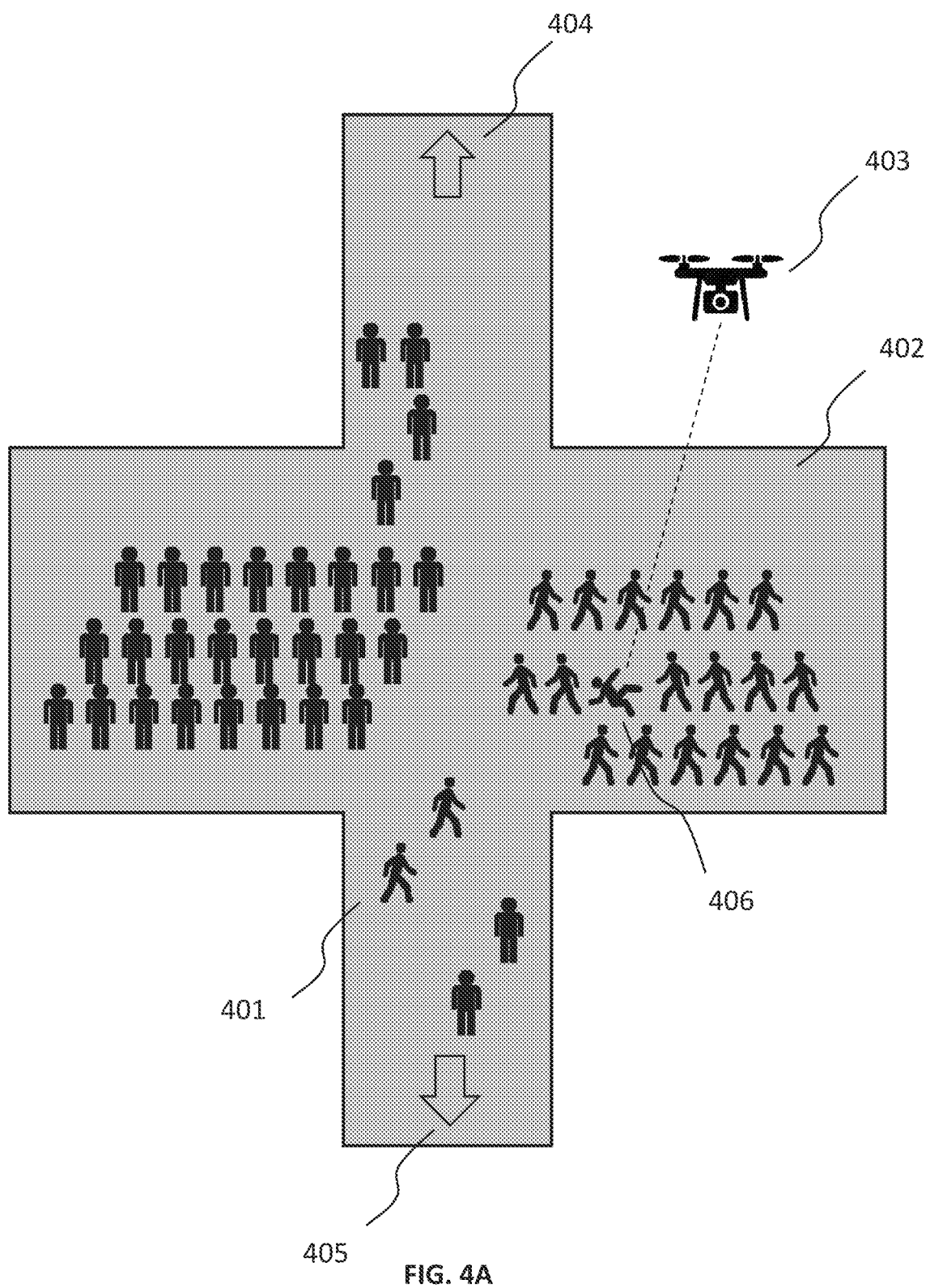
FIG. 4A illustrates a scenario for crowd control.

An example of crowd control is illustrated in FIG. 4A. A number of individuals (401) are present in a park 402, which has two exits, a north one 404 and a south one 405. An UAV 403 is instructed to monitor the crowd in the park. The status of each individual is monitored by the UAV. Therefore, when individual 406 falls, the UAV immediately detects the situation and prompts for appropriate responses.

In some instances, the response includes generating a movement signal instructing one or more of the objects of the target to move to certain direction. For example, for the situation detected in FIG. 4A, a movement signal instructs individuals around the falling individual to move away. Similarly, the movement signal instructs individuals from other places from coming to where the situation occurs. In another example, the movement signal instructs the individuals to evacuate, that is, to move to either of the exits 404 or 405, or paths leading to the exits.

The detection and transmission of movement signal can be implemented with mechanism suitable for the environment. At day time, visible light sensors or cameras would suffice for the detection. At night, infrared sensors may be more sensitive. Likewise, movement signals may be provided as a light signal, a laser projection, a light (e.g., LED) on the UAV, or an audio signal. Audio signals from loud speakers may be effective when controlling a large crowd. Flashing lights, either equipped on the UAV or placed at suitable position within or around the crowd may also be used. The lights or speakers are not necessarily equipped with the sensor and can be connected wirelessly.

Figure 4B:
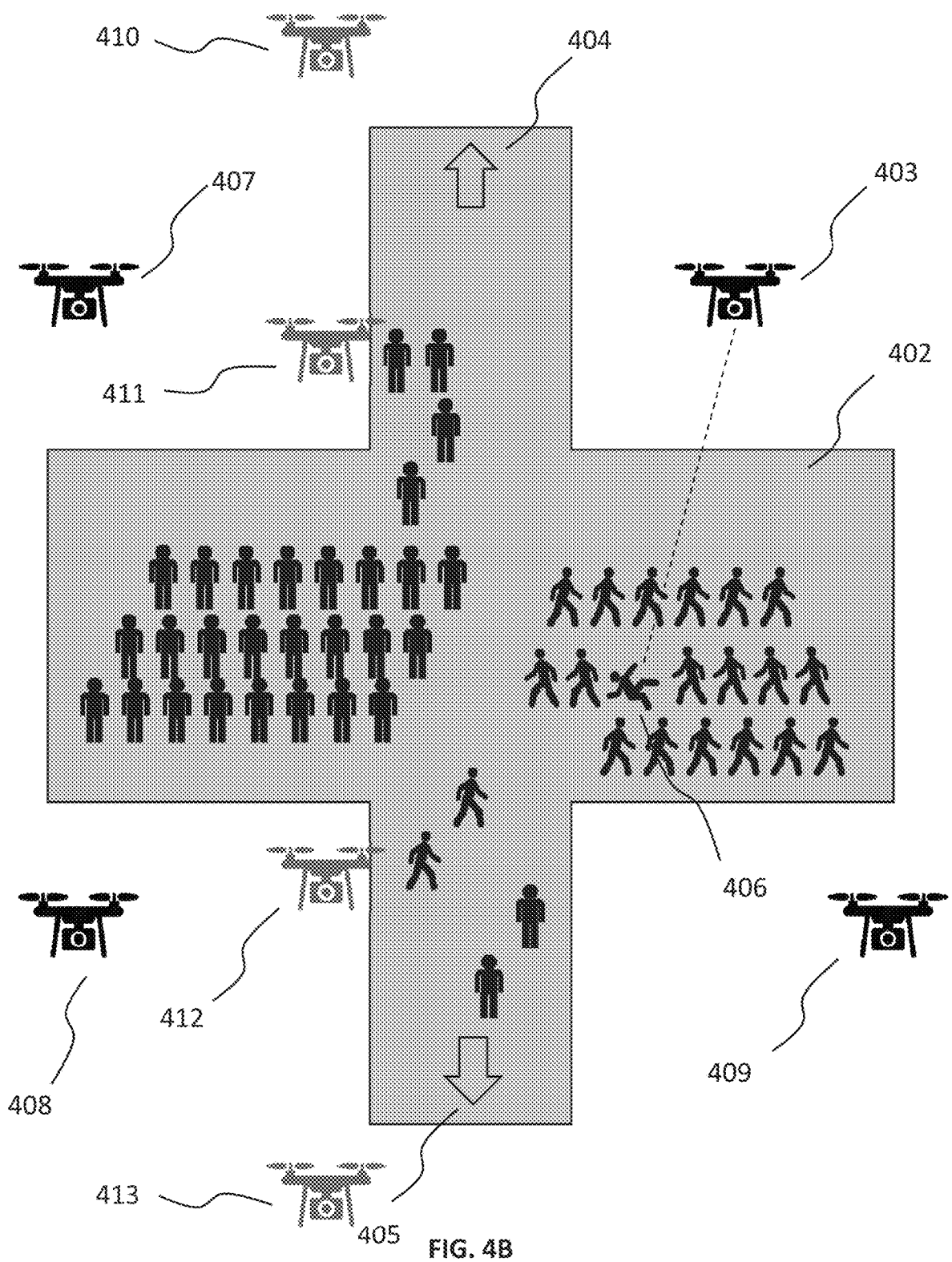
FIG. 4B shows that multiple devices can be used for target acquisition, tracking and controlling.

In some scenarios, such as monitoring or controlling a large crowd, it may be useful to use more than one devices that are capable of target acquisition, tracking, or movement instruction. Using the situation illustrated in FIG. 4A as an example, more than one UAVs may be used to monitoring the crowd. With reference to FIG. 4B, UAVs 403, 407, 408 and 409 are designated crowd monitoring devices. Each of them is equipped with at least an image sensor, such as an infrared sensor.

While in operation, the actions of these monitoring devices can be coordinated through a central server, or by one of the devices serving as a coordinator. Each of these devices are wirelessly connected, directly or indirectly. Coordination can be made in term of assigning each device to a divided area. Alternatively or in addition, each monitoring device can carry out different functions. For instance, device 403 is in charge of detecting falling of individuals; device 407 may monitor the density of the crowd; device 408 may be monitoring environmental factors, such as temperature, wind, rain or noise; device 409 may conduct survey of the area, including examining paths, exits, or lightly-occupied areas and update the survey.

Also in FIG. 4B, shown are UAVs 410, 411, 412 and 413 that are not necessarily equipped with sensor, but are in wireless communication, directly or indirectly, with the other UAVs. These UAVs may be designated for providing movement signals. In one example, at least one of these UAVs provides an audio signal. In another example, at least one of these UAVs provides a projected light signal. In another example, two or more of these UAVs collectively provide a visual signal, such as sequential flashing, to indicate movement directions.

When multiple devices are used, the role of each device may be fixed, or changed depending on needs. Each device can have the same configuration but are commanded to carry out different functions at different times; it is also possible that some of the devices have different hardware configuration than others.

Figure 5A:
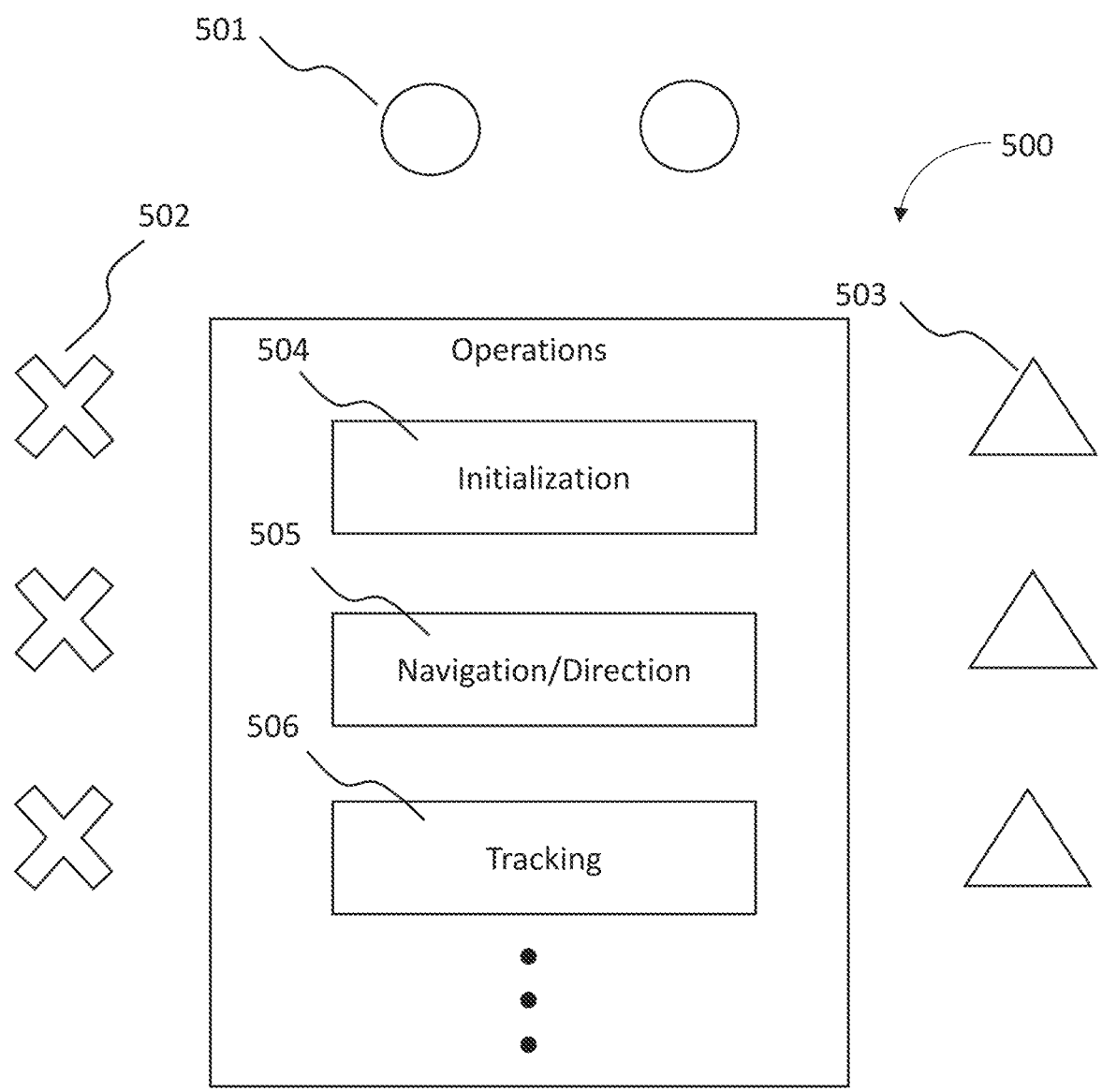
FIG. 5A is an illustrative flow chart for target acquisition, direction provision, and tracking.

FIG. 5A illustrates another work flow of the coordination system 500. The system includes one or more controllers 501 and one or more UAVs 502. Some of the UAVs may have the same hardware configuration including, such as, an image sensor, a processor, a propulsion system having a number of rotors, a wireless module, and a laser transmitter. Some other UAVs may include, instead of a laser transmitter, a speaker. Each of these UAVs may be wirelessly connected to the controllers. The wireless connection between the UAVs and the controllers enables the UAVs to transmit detected information to the controllers and receive instructions from the controllers.

The illustrated system can be used for acquiring one or more targets 503. The acquisition commences with an initialization step 504, which may include receiving an initialization signal at the controller or the UAV. Examples of initialization signals are provided above, and may include electronic messages that include geographic locations, body movement or gestures, without limitation. Upon receiving the initialization signal, the UAV may provide a solicitation signal that triggers an action from the target. If the action is recognized (e.g., detected by the UAV and acknowledged by the UAV or the controller), the target is validated and acquired.

At step 505, the system may provide navigation guidance or direction to the acquired target. Before providing such guidance or direction, it may be useful to acquire environmental features associated with the target for effective display (for visual guidance, or broadcasting if audio guidance). It is possible that a target may be lost during navigation, and thus it is useful to keep tracking the target (506) and use varying signals to remind the target to keep up with the direction, the details of which are also provided herein.

The presently disclosed technology may be implemented with various types of aircrafts, such as unmanned aerial vehicles (UAV). The UAV may include a propulsion system having a number of rotors. Any number of rotors may be provided (e.g., one, two, three, four, five, six, or more). The rotors, rotor assemblies, or other propulsion systems of the UAV may enable the UAV to hover and maintain position, change orientation, and change location.

Figure 5B:
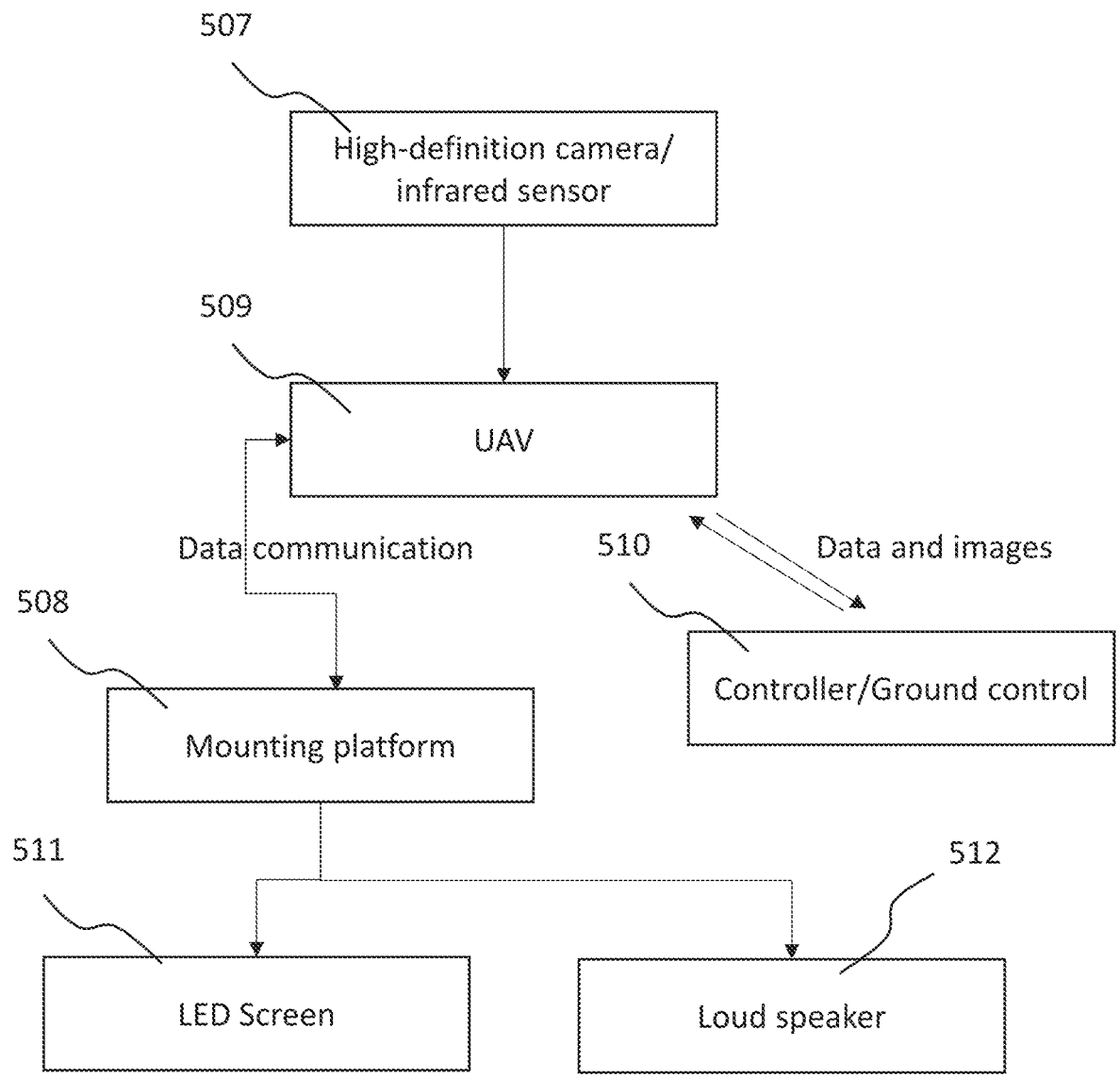
FIG. 5B illustrates a configuration of a system for target acquisition, direction provision, and tracking.

With reference to FIG. 5B, the UAV (509) may be equipped with a high-definition camera or an infrared sensor (507), which detects various signals such as initialization signals, environmental features and movements. Such signals are fed to the UAV which, in the one hand, exchanges such information with a controller or ground control center (510). The control center can analyze the information and transmit back certain data or instruction.

The UAV may also be in data communication with a mounting platform (508) coupled to a LED screen (511) and a loud speaker (512). The data communication enables the UAV, hence the control center, to operate the LED screen or the loud speaker to provide navigation or crowd control signals.

Figure 6:
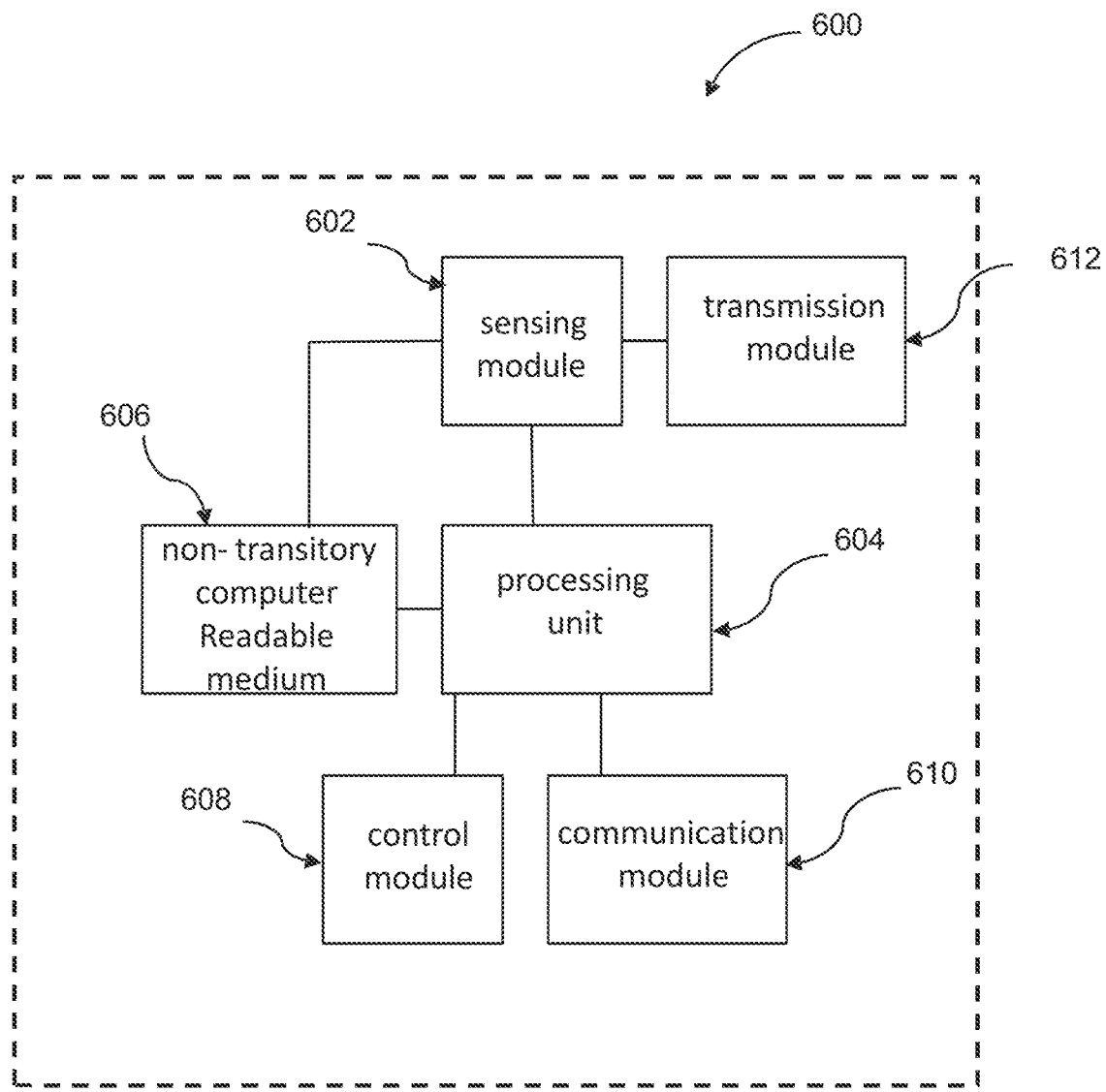
FIG. 6 is a schematic illustration by way of block diagram of a system for controlling a movable object.

FIG. 6 is a schematic illustration by way of block diagram of a system 600 for controlling an aircraft/UAV, in accordance with some embodiments. The system 600 can be used in combination with any suitable embodiment of the systems, devices, and methods disclosed herein. The system 600 can include a sensing module 602, processing unit 604, non-transitory computer readable medium 606, control module 608, and communication module 610.

The sensing module 602 can utilize different types of sensors that collect information relating to the aircrafts in different ways. Different types of sensors may sense different types of signals or signals from different sources. For example, the sensors can include inertial sensors, GPS sensors, proximity sensors (e.g., lidar), a radar u nit, or vision/image sensors (e.g., a camera). The sensing module 602 can be operatively coupled to a processing unit 604 having a plurality of processors. In some embodiments, the sensing module can be operatively coupled to a transmission module 612 (e.g., a Wi-Fi image transmission module) configured to directly transmit sensing data to a suitable external device or system. For example, the transmission module 612 can be used to transmit images captured by a camera of the sensing module 602 to a remote terminal.

The processing unit 604 can have one or more processors, such as a programmable processor (e.g., a central processing unit (CPU)). The processing unit 604 can be operatively coupled to a non-transitory computer readable medium 606. The non-transitory computer readable medium 606 can store logic, code, and/or program instructions executable by the processing unit 604 for performing one or more steps. The non-transitory computer readable medium can include one or more memory units (e.g., removable media or external storage such as an SD card or random access memory (RAM)). In some embodiments, data from the sensing module 602 can be directly conveyed to and stored within the memory units of the non-transitory computer readable medium 606. The memory units of the non-transitory computer readable medium 606 can store logic, code and/or program instructions executable by the processing unit 604 to perform any suitable embodiment of the methods described herein. For example, the processing unit 604 can be configured to execute instructions causing one or more processors of the processing unit 604 to analyze sensing data produced by the sensing module. The memory units can store sensing data from the sensing module to be processed by the processing unit 604. In some embodiments, the memory units of the non-transitory computer readable medium 606 can be used to store the processing results produced by the processing unit 604.

In some embodiments, the processing unit 604 can be operatively coupled to a control module 608 configured to control a state of the aircraft. For example, the control module 608 can be configured to control the propulsion mechanisms of the aircraft to adjust the spatial disposition, velocity, and/or acceleration of the aircraft with respect to six degrees of freedom. Alternatively or in combination, the control module 608 can control one or more of a state of a carrier, payload, or sensing module.

The processing unit 604 can be operatively coupled to a communication module 610 configured to transmit and/or receive data from one or more external devices (e.g., a terminal, display device, or other remote controller). Any suitable means of communication can be used, such as wired communication or wireless communication. For example, the communication module 610 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 610 can transmit and/or receive one or more of sensing data from the sensing module 602, processing results produced by the processing unit 604, predetermined control data, user commands from a terminal or remote controller, and the like.

The components of the system 600 can be arranged in any suitable configuration. For example, one or more of the components of the system 600 can be located on the aircraft, carrier, payload, terminal, sensing system, or an additional external device in communication with one or more of the above. Additionally, although FIG. 6 depicts a single processing unit 604 and a single non-transitory computer readable medium 606, one of skill in the art would appreciate that this is not intended to be limiting, and that the system 600 can include a plurality of processing units and/or non-transitory computer readable media. In some embodiments, one or more of the plurality of processing units and/or non-transitory computer readable media can be situated at different locations, such as on the aircraft, carrier, payload, terminal, sensing module, additional external device in communication with one or more of the above, or suitable combinations thereof, such that any suitable aspect of the processing and/or memory functions performed by the system can occur at one or more of the aforementioned locations.

Figure 7:
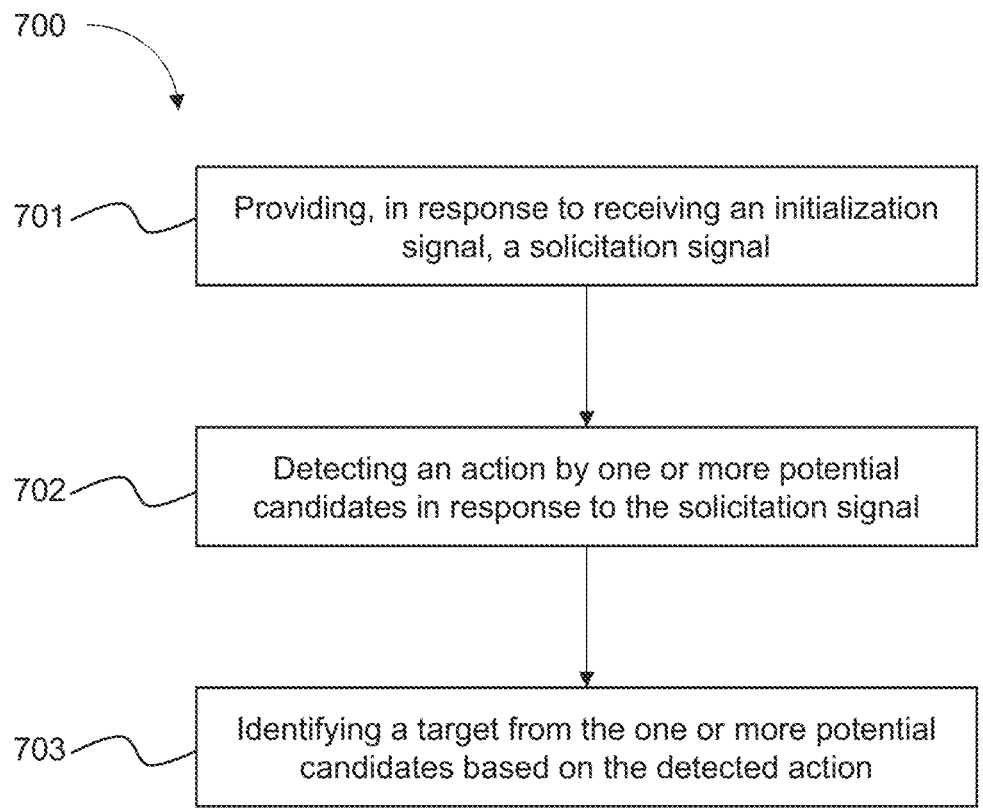
FIG. 7 shows a flowchart of acquiring a target for a movable object, in accordance with an embodiment of the disclosure.

FIG. 7 shows a flow chart illustrating a method 700 for acquiring a target for a movable object. At step 701, in response to receiving an initialization signal, a solicitation signal may be provided. At step 702, an action may be detected by one or more potential candidates in response to the solicitation signal. At step 703, a target may be identified from the one or more potential candidates based on the detected action.

In some embodiments, the initialization signal comprises an association with a geographic location, or a visual, sound or electronic signal in a predefined area. In some embodiments, the visual signal comprises a body gesture or body movement. In some embodiments, the body gesture or body movement comprises raising an arm, bending of an upper body, taking a step, initiation of a movement by a static person, or stopping of a moving person.

In some embodiments, the geographic location is received in a message transmitted from a remote device. In some embodiments, the solicitation signal is selected from the group consisting of a visual signal, an audio signal, and an electronic signal. In some embodiments, the visual signal comprises a light projected on a surface. In some embodiments, the action is associated with the projected light. In some embodiments, the projected light forms a boundary of an area and the action comprises moving into the area. In some embodiments, the audio signal comprises a verbal instruction, and the action follows the verbal instruction. In some embodiments, the electronic signal is displayed as a visual direction and the action follows the visual direction.

In some embodiments, the method further comprises determining a geographic location of the identified target. In some embodiments, the determination takes into account the relative location of the target to the movable object that transmits the solicitation signal. In some embodiments, the determination further takes into account the location of the movable object. In some embodiments, the method further comprises determining a movement status of the identified target. In some embodiments, the determination takes into account the movement status of the apparatus. In some embodiments, the movable object is an unmanned aerial vehicle (UAV). In some embodiments, the method further comprises moving the UAV to follow the movement of the target.

In some embodiments, the method further comprises providing a status signal to indicate a status of the target based on whether the action satisfies a predefined compliance level. In some embodiments, the method further comprises transmitting a warning signal if the action does not satisfy a predefined compliance threshold. In some embodiments, the method further comprises transmitting a confirmation signal when the action satisfies the predefined compliance level, thereby identifying the potential candidate as the target.

In some embodiments, the solicitation signal, the warning signal and the confirmation signal differ from each other by shape, color, intensity, flashing frequency, or the combinations thereof. In some embodiments, the predefined compliance level comprises a time requirement for completing the action. In some embodiments, the method further comprises changing the conformation signal to the warning signal if the target fails to complete the further action.

In some embodiments, the method further comprises collecting information of an environment associated with the target, generating a navigation signal based on the collected environmental information, and providing the navigation signal to direct a movement by the target.

In some embodiments, the environmental information comprises geographical features, architectural features, traffic information, or potential obstacles. In some embodiments, the geographical features comprise location or shape of a slope, paving status or smoothness of a path, or location of non-solid surface. In some embodiments, the architectural features comprise location of a buildings, direction or boundary of roads, or road signs. In some embodiments, the traffic information comprises movement speed of traffic, distance to closest vehicle, or route to avoid traffic. In some embodiments, the potential obstacles comprise road blocks, uneven surfaces, or nearby moving objects.

In some embodiments, the navigation signal comprises a light signal, an audio signal, or an electronic signal. In some embodiments, the navigation signal comprises an electronic signal transmitted to a remote handheld or wearable device. In some embodiments, the navigation signal is a light signal projected on a surface.

In some embodiments, the method further comprises identifying the surface within a visual field of the target in the environment. In some embodiments, the surface is in the direction of the movement of the target. In some embodiments, the surface is within visual distance to the target. In some embodiments, the surface has a color, hue or shape contrast from the surrounding surfaces. In some embodiments, the surface is located on a ground, a bulletin board, or a portion of a vehicle carrying the object.

In some embodiments, the method further comprises checking a status of the target following the navigation signal. In some embodiments, the status comprises speed, direction, or distance to a desired location. In some embodiments, checking the status comprises sensing, with a light sensor, the target.

Figure 8:
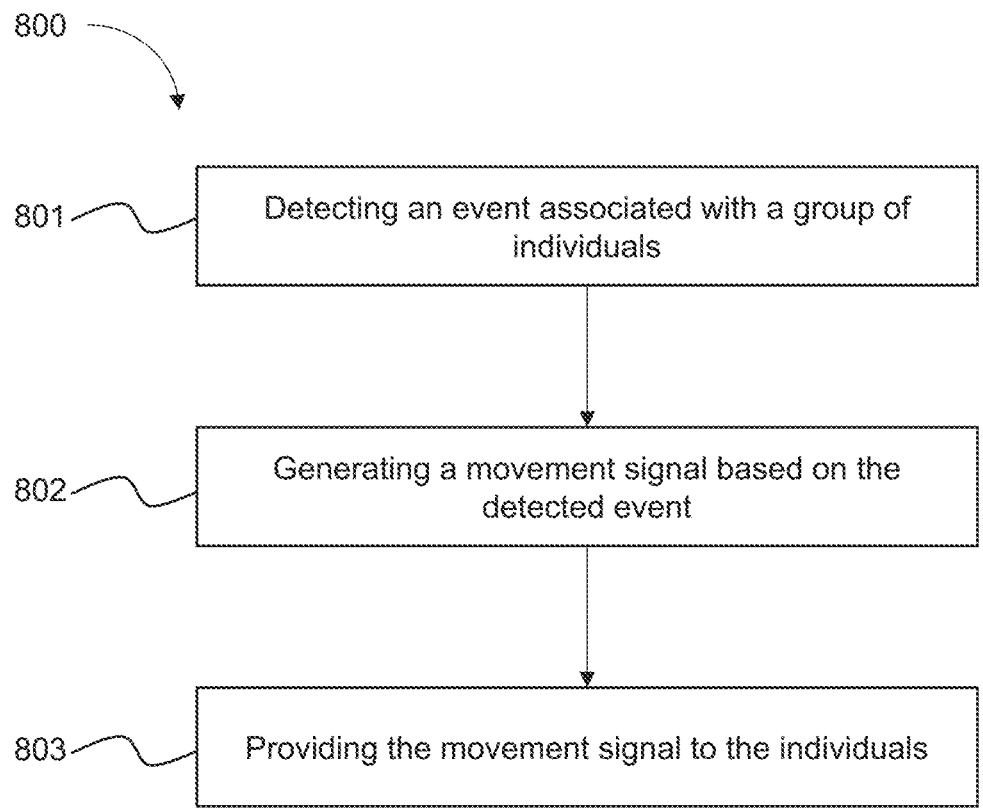
FIG. 8 shows a flowchart of directing movement of individuals, in accordance with an embodiment of the disclosure.

FIG. 8 shows a flow chart illustrating a method 800 for directing movement of one or more individuals. At step 801, an event may be detected that is associated with a group of individuals. At step 802, a movement signal is generated based on the detected event. At step 803, the movement signal is provided to the individuals.

In some embodiments, the event is associated with (a) a command from a remote device to move one or more of the individuals, (b) a time-out signal, (c) detected overcrowding in a section, (d) an event reported on a social network, or (e) a detected accident among the individuals. In some embodiments, the accident comprises falling of one of the individuals, a loud noise, or a physical fight.

In some embodiments, the movement signal is generated according to an evacuation plan for an area wherein the individuals are located. In some embodiments, the plan comprises paths and exits. In some embodiments, the method further comprises surveying the area to generate the plan. In some embodiments, the movement signal is an electronic signal, a visual signal or an audio signal. In some embodiments, the movement signal comprises a plurality of visual signal coordinated to indicate a moving route. In some embodiments, the visual signal moves or flashes.

In some embodiments, each signal is transmitted from an unmanned aerial vehicle (UAV).

In some embodiments, the detection comprising sensing the location or movement of at least one of the individuals. In some embodiments, the sensing is conducted by an apparatus different from that transmits the movement signal. In some embodiments, the method further comprises adjusting the movement signal based on the detection. In some embodiments, the movement signal is provided by a plurality of movable objects collectively. In some embodiments, at least two of the movable objects form a line with the signal directing the individuals to move along the line. In some embodiments, at least two of the movable objects move at different directions. In some embodiments, at least three movable objects form a shape and collectively provide the signal.

In some embodiments, detecting of the event is conducted by a movable object different from the plurality of movable objects. In some embodiments, the method further comprises comprising conducting a survey of an environment of the individuals. In some embodiments, the movable objects provide the signal in a concurrent manner. In some embodiments, the movable objects provide the signal in a sequential manner.

Systems, apparatuses, non-transitory computer-readable media are also provided that support or implement various methods and techniques of the present disclosure. For instance, one embodiment provides a system for supporting aerial operation over a surface, comprising a processor and instructions which, when executed by the processor, operate to: obtain a representation of the surface that comprises a plurality of flight sections; and identify a flight path that allows an aircraft, when following the flight path, to conduct an operation over each flight section.

Another embodiment provides a system for acquiring a target for a movable object, comprising a processor and instructions which, when executed by the processor, operate to provide, in response to receiving an initialization signal, a solicitation signal; detect an action by one or more potential candidates in response to the solicitation signal; and identify a target from the one or more potential candidates based on the detected action.

Another embodiment provides a system for directing movement of individuals, comprising a processor and instructions which, when executed by the processor, operate to: detect an event associated with a group of individuals; generate a movement signal based on the detected event; and provide the movement signal to the individuals.

Another embodiment provides a non-transitory computer-readable medium for acquiring a target for a movable object, comprising instructions stored therein, wherein the instructions, when executed by a processor, perform the steps of: providing, in response to receiving an initialization signal, a solicitation signal; detecting an action by one or more potential candidates in response to the solicitation signal; and identifying a target from the one or more potential candidates based on the detected action.

Another embodiment provides a non-transitory computer-readable medium for directing movement of individuals, comprising instructions stored herein, wherein the instructions, when executed by a processor, performs the steps of: detecting an event associated with a group of individuals; generating a movement signal based on the detected event; and providing the movement signal to the individuals.

Another embodiment provides a system for acquiring a target for a movable object, comprising: a processor; a first module configured to provide, in response to receiving an initialization signal, a solicitation signal; a second module configured to detect an action by one or more potential candidates in response to the solicitation signal; and a third module configured to identify a target from the one or more potential candidates based on the detected action.

Another embodiment provides a system for directing movement of individuals, comprising: a processor; a first module configured to detect an event associated with a group of individuals; a second module configured to generate a movement signal based on the detected event; and a third module configured to provide the movement signal to the individuals. Another embodiment provides a system for acquiring a target for a movable object, comprising a processor, means for providing, in response to receiving an initialization signal, a solicitation signal, means for detecting an action by one or more potential candidates in response to the solicitation signal, and means for identifying a target from the one or more potential candidates based on the detected action.

Another embodiment provides a system for directing movement of individuals, comprising a processor, means for detecting an event associated with a group of individuals, means for generating a movement signal based on the detected event, and means for providing the movement signal to the individuals.

Features of the present disclosure can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Features of the disclosure may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

The invention claimed is:

1. A method for acquiring a target for a movable object, the method comprising:
    receiving, through at least one sensor, an initialization signal associated with one or more potential candidates;
    generating and providing, through a processor in response to receiving the initialization signal, a solicitation signal, the solicitation signal including an instruction to project a pattern near the one or more potential candidates;
    generating, by the processor, a first status signal to facilitate identification of the target from the one or more potential candidates with an instruction for a movement toward a center of the projected pattern;
    identifying, by the processor, the target from the one or more potential candidates by determining a candidate moving toward the center of the projected pattern; and
    sending, by the processor, according to a level of compliance of a position of the target with respect to the center of the projected pattern, a second status signal to indicate an offset of the target from the center of the projected pattern.

2. The method of claim 1, wherein:
    a first area is associated with the one or more potential candidates; and
    the initialization signal comprises:
        an association with a geographic location, or
        a visual, sound, or electronic signal in a second area.

3. The method of claim 2, wherein the visual signal comprises raising an arm, bending of an upper body, taking a step, initiation of a movement by a static person, or stopping of a moving person.

4. The method of claim 2, wherein the geographic location is received in a message transmitted from a remote device.

5. The method of claim 1, wherein the solicitation signal is selected from a group consisting of a visual signal, an audio signal, and an electronic signal.

6. The method of claim 5, wherein:
    the visual signal comprises a light projected on a surface, and the movement is associated with the projected light;
    the audio signal comprises a verbal instruction, and the movement follows the verbal instruction; or
    the electronic signal is displayed as a visual direction, and the movement follows the visual direction.

7. The method of claim 1, further comprising determining a geographic location of the target.

8. The method of claim 7, wherein determining the geographic location takes into account at least one of a relative location of the target to the movable object that transmits the solicitation signal or a location of the movable object.

9. The method of claim 1, further comprising determining a movement status of the target.

10. The method of claim 1,
    wherein the movable object is an unmanned aerial vehicle (UAV);
    the method further comprising moving the UAV to follow the movement of the target.

11. The method of claim 1,
    wherein:
        the movement is performed by the one of the one or more potential candidates; and
        the method comprising transmitting a confirmation signal indicating the one of the one or more potential candidates is the target.

12. The method of claim 11, wherein the level of compliance further comprises a time requirement for completing the movement.

13. The method of claim 1, further comprising:
    collecting information of an environment associated with the target;
    generating a navigation signal based on the collected environmental information; and
    providing the navigation signal to direct the movement by the target.

14. The method of claim 13, wherein the environmental information comprises at least one of:
    a geographical feature comprising at least one of a location or a shape of a slope, a paving status or a smoothness of a path, or a location of a non-solid surface;
    an architectural feature comprising at least one of a location of a building, a direction or a boundary of a road, or a road sign;
    traffic information comprising at least one of a movement speed of traffic, a distance to closest vehicle, or a route to avoid the traffic; or a potential obstacle comprising at least one of a road block, an uneven surface, or a nearby moving object.

15. The method of claim 13, wherein the navigation signal comprises at least one of:
a light signal projected on a surface,
an audio signal, or
an electronic signal transmitted to a remote handheld or wearable device.

16. The method of claim 15,
wherein the navigation signal is the light signal projected on the surface;
the method further comprising identifying the surface within a visual field of the target in the environment.

17. The method of claim 16, wherein the surface:
is in the direction of the movement of the target;
is within a visual distance to the target;
has a color, hue, or shape contrast from surrounding surfaces; and/or
is located on a ground, a bulletin board, or a portion of a vehicle carrying the movable object.

18. The method of claim 13, further comprising:
checking a status of the target following the navigation signal by sensing the target with a light sensor;
wherein the status comprises at least one of a speed of the target, a direction of the movement of the target, or a distance from the target to a desired location.

19. A system for acquiring a target for a movable object comprising:
a processor; and
a memory storing instructions that, when executed by the processor, cause the processor to:
generate and provide, in response to receiving an initialization signal, a solicitation signal, the solicitation signal including an instruction to project a pattern near one or more potential candidates and the initialization signal being associated with the one or more potential candidates and received through at least one sensor; and
generate a first status signal to facilitate identification of the target from the one or more potential candidates with an instruction for a movement toward a center of the projected pattern;
identify the target from the one or more potential candidates by determining a candidate moving toward the center of the projected pattern; and
send, according to a level of compliance of a position of the target with respect to the center of the projected pattern, a second status signal to indicate an offset of the target from the center of the projected pattern.

20. A non-transitory computer-readable storage medium storing instructions that, when executed by a processor, cause the processor to:
generate and provide, in response to receiving an initialization signal, a solicitation signal, the solicitation signal including an instruction to project a pattern near one or more potential candidates and the initialization signal being associated with the one or more potential candidates and received through at least one sensor; and
generate a first status signal to facilitate identification of the target from the one or more potential candidates with an instruction for a movement toward a center of the projected pattern;
identify the target from the one or more potential candidates by determining a candidate moving toward the center of the projected pattern; and
send, according to a level of compliance of a position of the target with respect to the center of the projected pattern, a second status signal to indicate an offset of the target from the center of the projected pattern.

* * * * *